(12) United States Patent
Baur et al.

(10) Patent No.: US 7,656,490 B1
(45) Date of Patent: Feb. 2, 2010

(54) LC DISPLAY DEVICE WITH PARALLEL FIELD COMPONENT

(75) Inventors: Gunter Baur, Freiburg (DE); Waltraud Fehrenbach, Munich (DE); Barbara Weber Ne Staudacher, Ettenheim (DE); Friedrich Windscheid, Freiburg-Tiengen (DE); Rudolf Kiefer, Vorstetten (DE)

(73) Assignee: Merck Patent Gesellschaft, Darmstadt (DE)

( * ) Notice: Subject to any disclaimer, the term of this patent is extended or adjusted under 35 U.S.C. 154(b) by 0 days.

(21) Appl. No.: 08/627,386

(22) Filed: Apr. 4, 1996

Related U.S. Application Data (60) Division of application No. 08/466,068, filed on Jun. 6, 1995, now Pat. No. 5,576,867, which is a continuation of application No. 08/363,968, filed on Dec. 23, 1994, now abandoned, which is a continuation of application No. 07/877,187, filed as application No. PCT/EP91/00022 on Jan. 9, 1991, now abandoned.

(30) Foreign Application Priority Data

Jan. 9, 1990 (DE) .................................. P400045

(51) Int. Cl.
G02F 1/1343 (2006.01)
G02F 1/1337 (2006.01)
(52) U.S. Cl. ....................... 349/141; 349/136
(58) Field of Classification Search .................. 359/68, 359/67, 87; 349/141, 33, 180, 181, 136
See application file for complete search history.

(56) References Cited

U.S. PATENT DOCUMENTS

| | | | |
|---|---|---|---|
| 3,674,342 A | 7/1972 | Castellano et al. |
| 3,736,047 A | 5/1973 | Gelber et al. |
| 3,774,989 A | 11/1973 | Takahashi |
| 3,807,831 A | 4/1974 | Soref |
| 3,834,794 A | 9/1974 | Soref |
| 3,854,751 A | 12/1974 | Haas et al. |
| 4,039,252 A | 8/1977 | Mizuno et al. |
| 4,116,544 A | 9/1978 | Soref |
| 4,345,249 A | 8/1982 | Togashi |
| 4,844,569 A | 7/1989 | Wada et al. |
| 6,887,534 B2 | 5/2005 | Nakata et al. |

FOREIGN PATENT DOCUMENTS

| | | |
|---|---|---|
| DE | 23 28 581 | 1/1974 |
| DE | 24 59 533 | 7/1975 |

(Continued)

OTHER PUBLICATIONS

"Liquid Crystal Displays", Birendra Bahadur, Mol. Cryst. Liq. Cryst.,1984, vol. 109, pp. 3-98, 1984.*

(Continued)

*Primary Examiner*—Andrew Schechter
(74) *Attorney, Agent, or Firm*—Millen, White, Zelano & Branigan, P.C.

(57) ABSTRACT

An electro-optical display device comprising a liquid crystal layer achieves switching using an electric field component which is predominantly parallel to the surface of the liquid crystal layer. Low dependence of image contrast on viewing angle is achieved by selection of parameters including pretilt angle $\alpha_0$, orientation angle $\beta_0$, etc. of the liquid crystal molecules in the layer.

71 Claims, 9 Drawing Sheets

FOREIGN PATENT DOCUMENTS

| | | |
|---|---|---|
| DE | 3 031 126 | 4/1982 |
| DE | 3031 126 | 4/1982 |
| DE | 227-542 | 9/1985 |
| DE | 277-809 | 9/1985 |
| GB | 1 475 378 | 9/1974 |
| GB | 1506570 | 4/1978 |
| JP | 50-007495 | 1/1975 |
| JP | 53-48542 | 5/1978 |
| JP | 53-77646 | 7/1978 |
| JP | 53-89753 | 8/1978 |
| JP | 54-12762 | 1/1979 |
| JP | 54-36752 | 3/1979 |
| JP | 54-42163 | 4/1979 |
| JP | 54-43047 | 4/1979 |
| JP | 54-43048 | 4/1979 |
| JP | 54-153047 | 12/1979 |
| JP | 55-60918 | 5/1980 |
| JP | 56-88179 | 7/1981 |
| JP | 56-128988 | 10/1981 |
| JP | 58-2872 | 1/1983 |
| JP | 60-217336 | 10/1985 |
| JP | 60-218624 | 11/1985 |
| JP | 62-189710 | 8/1987 |
| JP | 62-199708 | 9/1987 |
| JP | 62-319748 | 12/1987 |
| JP | 01120528 | 5/1989 |
| JP | H1-120528 | 5/1989 |
| JP | 52-82264 | 10/1993 |
| JP | 63-2593 | 1/1998 |
| WO | 84/04601 | 11/1984 |

OTHER PUBLICATIONS

Uchida and Seki, "Surface Alignment of Liquid Crystals" in Liquid Crystals Applications and Uses, ed. Bahadur (1992).*
Cognard, Molecular Liquid Crystals, Supplement pp. 1-77 (1987).
Schadt et al., Applied Physics Letter, 50(5):236-238 (Feb. 2, 1987).
Patent Abstracts of Japan, vol. 13, No. 219, P-875 (May 23, 1989).
Patent Abstracts of Japan, vol. 13, No. 242, P-880 (Jun. 7, 1989).
Patent Abstracts of Japan, vol. 13, No. 428, P-936 (Sep. 25, 1989).
Patent Abstracts of Japan, vol. 13, No. 460, P-946 (Oct. 18, 1989).
Funada et al., Journal of the Institute of TV-Engineers of Japan, vol. 42, No. 10, pp. 1029-1034 (1988).
Decision on Opposition of Japanese No. 10-75171.
Transation of 50-007495.
Patent Abstracts of Japan, P-946, Oct. 18, 1989, vol. 13/No. 460, (Abstract of 63-2593).
Patent Abstracts of Japan, P-936, Sep. 25, 1989, vol. 13/No. 428, (Abstract of 62-319748).
Schadt et al., Applied Physics Letter, 18(4):127-128 (Feb. 15, 1971).
Aviram et al., IBM Technical Disclosure Bulletin 15(6):1812-1813 (Nov. 1972).
Soref, Appl. Phys. Lett., 22(4):165-166 (Feb. 15, 1973).
Soref, J. Applied Physics, 45(12):5466-5468 (Dec. 1974).
Soref, Proceedings of the IEEE, pp. 1710-1711 (Dec. 1974).
Fahrenschon et al., Applied Physics, 11:67-74 (1976).
Patent Abstracts of Japan, vol. 3, No. 38, E-101 (Mar. 30, 1979).
Pohl et al., Applied Physics Letter, 38(7):497-499 (Apr. 1, 1981).
Scheffer et al., J. Applied Physics, 58(8):3022-3031 (Oct. 15, 1985).
Werner, K., "The best of '96, Second Annual Display of the Year Awards," Information Display, vol. 12, pp. 12-15 (1996).
Ohta, M. et al, "Electric Field Analysis in TFT-LCDs With In-Plane Switching Mode of Nematic LCs," Euro Display '96, (6th IDRC of SID), pp. 49-52 (Presentation 5.1 & Conference Digest)(1996).
Tajima, Z. et al., "Hitachi Super TFT-LCD Offers 140° Viewing Angle," Nikkei Electronics Asia, Mar. 1996, pp. 73-76.
Norris, B., "EID '95: International Giants and Local Flair," Information Display, vol. 12, No. 3, pp. 24-28 (1996).
Chinnock, C., "Large-Screen Display Improves Viewing Angles," Laser Focus World, Nov., pp. 20-24 (1996).
Matsumoto, S. et al., "Display Characteristics of In-Plane-Switching (IPD) LCDs and a Wide-Viewing-Angle 14.5 in IPS TFT-LCD," Euro Display '96 (16th IDRC of SID) pp. 445-448 (presentation LP-A and Conference Digest)(1996).
Ota, K., "Hoshiden 14.5 inch IPS TFT-LCD Offers 140° Viewing Angle," Development of 14.5 Type IPS TFT-LCD With a Viewing Angle of 140° by Hoshiden, (in Japanese, English translation available), Editorial Dept., Technical Report, Monthly LCD Intelligence, pp. 26-29, Jan. 1997.
English translation of LCD Intelligence, 1, 26-29 (1997).
1996 Nikkei BP Technical Award, Grand Prize, (Apr. 1996), Japanese & English versions.
Society for Information Display, 1997 International Symposium, Seminar & Exhibition, Advance Program, pp. 10-11.
Joseph A. Castellano, "Liquid Gold: The Story of Liquid Crystal Displays and the Creation of an Industry," 2005, pp. 226, World Scientific Publishing Co., Toh Tuck Link, Singapore.
Joseph A. Castellano, "Liquid Gold: The Story of Liquid Crystal Displays and the Creation of an Industry," 2005, pp. 62, 63, 79, 269, 279, 284, and 293, World Scientific Publishing Co., Toh Tuck Link, Singapore.
Television Society, Inc., Fujio Commemorative Award, (May 1996), Japanese & English versions.
Advanced Display of the Year '96, Display Module Section, Grand Prix, (Sponsored by: Display and Imaging and Co-sponsored by: Lead Exhibition Japan, Ltd.) (Jul. 1996).

* cited by examiner

LC DISPLAY DEVICE WITH PARALLEL FIELD COMPONENT

This is a division, of the application Ser. No. 08/466,068 filed Jun. 6, 1995, now U.S. Pat. No. 5,576,867, which is a continuation of application Ser. No. 08/363,968 filed Dec. 23, 1994, abandoned, which is a continuation of application Ser. No. 07/877,187 filed Aug. 6, 1992, also abandoned, which is the national phase of PCT/EP91/00022, filed Jan. 9, 1991.

The invention relates to an electrooptical liquid crystal switching element, comprising a liquid crystal layer and a reorientation means for reorienting the liquid crystal layer into a current orientation in which the electrooptical switching element has a different light transmission, the reorientation means comprising a field-generating structure for generating an electric field effecting the reorientation and the electric field of the field-generating structure having a field component oriented predominantly in parallel with the liquid crystal layer.

An electrooptical liquid crystal switching element of the above-mentioned kind is known from U.S. Pat. No. 3,854,751. In this liquid crystal switching element two electric fields are generated by the field-generating structure, one of which has a field component oriented predominantly in parallel with the liquid crystal layer, while the other has a field component oriented predominantly perpendicularly to the liquid crystal layer, the liquid crystal being connected with one electric field to the condition of minimum light transmission and with the other electric field to the condition of maximum light transmission by orienting the optical axis of the liquid crystal through one electric field perpendicular to the liquid crystal layer and through the other electric field in parallel with the liquid crystal layer. In those cases in which compensated cholesteric liquid crystals are used which in the absence of electric fields orient spontaneously in such a way that their optical axis is oriented perpendicularly to the liquid crystal layer, one electric field is optionally dispensed with although according to U.S. Pat. No. 3,854,751 it is to be preferred in these cases as well to use both fields because the inherent orientation period of the self-orienting liquid crystals is relatively long and thus very unfavorable.

DE 24 59 533 A1 and DE 23 58 581 B2 also disclose electrooptical liquid crystal switching elements having a reorientation means with a field-generating structure whose electric field has a field component oriented predominantly in parallel with the liquid crystal layer. However, similar to the liquid crystal switching element according to U.S. Pat. No. 2,854,751 two electric fields perpendicular to each other are generated in the liquid crystal switching element according to DE 23 28 581 B2 to orient the optical axis of the liquid crystal in two orientations extending perpendicularly to each other, one of which orientations extends in parallel with and the other extends perpendicularly to the liquid crystal layer. This kind of reorientation of the optical axis of the liquid crystal also takes place in the liquid crystal switching element according to DE 24 59 533 A1, the compulsory orientation of the optical axis of the liquid crystal taking place perpendicularly to the liquid crystal layer by means of homeotropic boundary orientation of the liquid crystal.

Finally, WO 84/04601 discloses with respect to a liquid crystal, a comb-like field-generating structure whose field has a field component oriented predominantly in parallel with the liquid crystal layer. However, the means according to this citation is an optical guide in which the coupling-out of light is controlled by a change of the effective refractive index of the nucleus consisting of the liquid crystal or the cover formed by the liquid crystal by means of the field-generating structure.

Furthermore, JP 1-33521 (A) in Pat. Abstr. Jap. P-875, May 23, 1989, Vol. 13, No. 219, discloses to arranging electrodes in parallel planes, however, for the purpose of generating a storing scattering condition in an optical liquid crystal modulator.

In addition JP 1-179912 (A) in Pat. Abstr. Jap. P 946, Oct. 18, 1989, Vol. 13, No. 460, and JP 1-161217 (A) in Pat. Abstr. Jap. P-936, Sep. 25, 1989, Vol. 13, No. 428, describe liquid crystal indicating element components serving for improving the blocking state of a display, twisted liquid crystals having a certain orientation being used. Besides JP 1-44422 (A) in Pat. Abstr. Jap. P-880, Jun. 7, 1989, Vol. 13, No. 242, describes a liquid crystal indicating element in which the nematic liquid crystal has an orientation with a pretilt angle of 20° to 30°. However, this is a conventional liquid crystal structure in which the optical axis of the liquid crystal can be switched between a direction parallel with and perpendicular to the liquid crystal layer by applying an electric field.

Finally, GB 1 506 570 and JP 54-17756 (A) in Pat. Abstr. Jap. E-101, Mar. 30, 1979, Vol. 3, No. 38, discloses liquid crystal indicators having an optical compensator or reflector as well as dichroic dyes.

Further known electrooptical liquid crystal switching elements are described e.g. by M. Schadt and F. Leenhouts in "Appl. Phys. Lett.", Vol. 50, pages 236 et seq. (1987), as well as by T. J. Scheffer and J. Nehring in "J. Appl. Phys.", Vol. 58 pages 3022 et seq. (1985), furthermore by L. Phl., G. Weber, R. Eidenschink, G. Baur and W. Fehrenbach in "Appl. Phys. Lett.", Vol. 38, pages 497 et seq. (1981) and by M. Schadt and W. Helfrich in "Appl. Phys. Lett.", Vol. 18, pages 127 et seq. (1971).

Electrooptical liquid crystal switching elements are used particularly in liquid crystal display means, such as display screens of TV sets, computers, distributing centers and other facilities, installations or the like for changing the image spots of this liquid crystal display means, i.e. for changing the brightness and/or color of an image spot.

In the case of the formerly known and presently commercially available liquid crystal display means, which are also referred to as liquid crystal displays, the observation or viewing angle range, i.e. the angle range from which an image generating by means of the liquid crystal display means can be seen without essential optical misrepresentation, is restricted considerably because the contrast of the image depends on the viewing angle to a considerably strong extent.

As is shown by the enclosed investigation results, this dependence of the contrast of the known liquid crystal display means on the angle is due to the former reorientation of the optical axis of the liquid crystal layer between an orientation in parallel with the liquid crystal layer and an orientation perpendicular to the liquid crystal layer. The investigations conducted within the scope of the present invention determined that it is the deformation of the liquid crystal effected by such a reorientation which results in a very marked dependence of the transmission of the liquid crystal switching element, and thus the contrast, on the viewing angle.

Due to the present invention it has now been found that the dependence of the transmission, and thus the contrast, on the viewing angle is largely eliminated in an electrooptical liquid crystal switching element of the kind mentioned at the beginning, particularly one having a non-ferroelectric liquid crystal, when the electrooptical liquid crystal switching element is developed according to the invention in such a way that (a) the liquid crystal has a twistable structure and the amount of light transmission through the liquid crystal depends on its degree of twist;

(b) the liquid crystal is anchored in an alignment in the initial state in which it is in the untwisted or twisted state and its twisting axis remains perpendicular or substantially perpendicular to the liquid crystal layer; and (c) the field component of the reorientation means oriented predominantly in parallel with the liquid crystal layer can be varied in such a way that, for adjusting different light transmission degrees, the degree of twist of the liquid crystal is thereby changed by twisting the optical axis thereof in parallel or substantially in parallel with the liquid crystal layer.

In this way, the disadvantageous deformation of the liquid crystal effected by the former reorientation is largely eliminated and the transmission and contrast become essentially independent of the viewing angle.

The indication that the twisting axis remains "substantially" perpendicular to the liquid crystal layer and that the optical axis is twisted "substantially" in parallel with the liquid crystal layer is to mean that a certain pretilt angle $\alpha_0$ between 0° and 30° may be provided which is included by the alignment in the initial state of the liquid crystal layer at least on its layer side of the liquid crystal layer facing the field-generating structure and a plane in parallel with the liquid crystal layer. Here, the term alignment in the initial state of the liquid crystal layer is understood to mean the preferred direction of the molecular axes of the liquid crystal in the alignment in the initial state of the liquid crystal layer.

The liquid crystal switching element according to the invention is preferably developed in such a way that the field component of the reorientation means oriented predominantly in parallel with the liquid crystal layer can be varied such that the twisting degree of the liquid crystal is changed continuously or stepwise for the continuous or stepwise adjustment of varying light transmission degrees in the range between essentially maximum and minimum light transmission.

As shown by the enclosed investigation results regarding the dependence of the transmission on the viewing angle in the case of liquid crystal switching elements according to the invention, the transmission has virtually no dependence on the viewing angle in the case of the liquid crystal switching elements, according to the invention as compared to the known liquid crystal switching elements.

The electric field having the field component oriented predominantly in parallel with the liquid crystal layer can be obtained by using a field-generating structure comprising strip or line-type electrodes which extend in parallel with one another and in parallel with the liquid crystal layer and to which a different electric potential is applied alternately.

Preferred embodiments of such a field-generating structure are developed in such a way that
(a) the strip or line-type electrodes are arranged alternately in at least two planes in parallel with the liquid crystal layer, wherein the two planes may be formed particularly by the two opposite surfaces of an insulating sheet, thin plate, layer or the like; or
(b) the strip or line-type electrodes to which a different potential has been applied are arranged in the same plane in a comb-like engagement, wherein this plane can be formed particularly by the surface, facing the liquid crystal layer, of a substrate confining the liquid crystal layer or an insulating sheet, thin plate, layer or the like applied on such a substrate.

A further development of the electrooptical liquid crystal switching element according to the invention distinguishes itself in that the field component oriented predominantly in parallel with the liquid crystal layer forms an angle of orientation which is greater than 0° and less than 90° with the preferred direction which the liquid crystal layer has on its layer side facing the field-generating structure in its alignment in the initial state. In this way, domain formation due to a different rotation sense of adjacent liquid crystal switching elements or element areas is prevented, on the one hand, and short switching periods are achieved, on the other hand, since a clearly oriented initial torque of sufficient quantity results when the electric field is switched on due to the acute angle existing between the field component extending predominantly in parallel with the liquid crystal layer and the alignment in the initial state of the liquid crystal layer on its layer side facing the field-generating structure. The sense of rotation is given by this torque and thus the liquid crystal switching element is switched within the shortest possible period.

This liquid crystal switching element is preferably developed in such a way that
(a) the angle of orientation is greater than 70° and less than 90° when the dielectric anisotropy of the liquid crystal is positive or that
(b) when the liquid crystal has a negative dielectric anisotropy, the angle of orientation is less than 20° and greater than 0°.

When liquid crystal materials having positive dielectric anisotropy are used, a torque is induced which rotates the preferred direction (director) of the liquid crystal in the direction of the electric field, while when liquid crystal materials having negative dielectric anisotropy are used a torque is induced which rotates the preferred direction (director) in a plane perpendicular to the direction of the electric field. As outlined above, the angle of orientation should not be less than |70°| in the case of positive $\Delta\epsilon$ and not greater than |20°| in the case of negative $\Delta\epsilon$, in regard of the electrooptical characteristics and switching times.

A liquid crystal material, particularly a non-ferroelectric liquid crystal material, or negative dielectric anisotropy $\Delta\epsilon$ is particularly preferred in the liquid crystal switching element according to the invention, since another kind of domain formation can be eliminated by this when, in addition to the component oriented in parallel with the liquid crystal layer, the electric field also has a component oriented perpendicular thereto, which is usually the case in practice. For example, such a case is given when the electric field, as occurs preferably, is generated by strip or line-type electrodes, since then a component also effective in the case of high fields is also present perpendicular to the liquid crystal layer together with the component extending in parallel with or almost in parallel with the liquid crystal layer. In the case of liquid crystal materials having positive $\Delta\epsilon$ this results in a reorientation of the liquid crystal in the case of high fields, in which the preferred direction is turned out of the plane of the liquid crystal layer. This is accompanied by domain formation, undesired in many cases, so that only the lower range of the electrooptical characteristic becomes usable. In the case of materials having a negative $\Delta\epsilon$, this field component induces a torque rotating the preferred direction of the liquid crystal in the plane of the liquid crystal layer. The above-described reorientation is thus prevented, and a considerably greater portion of the electrooptical characteristic becomes usable.

Another important further development of the liquid crystal switching elements according to the invention distinguishes itself in that, at least on its layer side facing the field-generating structure, the alignment in the initial state of the liquid crystal layer includes a pretilt angle greater than 0° and less than 30° with a plane in parallel with the liquid crystal layer.

This serves for obtaining a favorable deformability of the liquid crystal when the electric field is applied directly adjacent to the anchoring layer for the liquid crystal.

With respect to the alignment in the initial state of the liquid crystal it is preferred that
(a) the liquid crystal has an untwisted structure in its alignment in the initial state and can be reoriented into a twisted structure by the field component oriented predominantly in parallel with the liquid crystal layer, in which structure the axis of twisting is perpendicular to the liquid crystal layer, or that
(b) the liquid crystal has a twisted structure in its alignment in the initial state whose axis of twisting is perpendicular to the liquid crystal layer and which can be detwisted by the field component oriented predominantly in parallel with the liquid crystal layer.

The other fundamental design of the liquid crystal switching elements is preferably developed in such a way that
(1) a polarizer is provided on one side of the liquid crystal layer to operate the electrooptical liquid crystal switching element in the direct-light mode and an analyzer is provided on the other side; or that
(2) for operating the electrooptical liquid crystal switching element in the reflection mode a polarizer/analyzer is provided on one side of the liquid crystal layer and a reflector is provided on the other side.

In this case, a birefringent optical compensator can be provided between the liquid crystal layer and the polarizer. When a separate analyzer is provided as in the former case, the optical compensator can also be provided between the liquid crystal layer and the analyzer instead.

In particular, the liquid crystal layer may contain a dichroic dye, and a polarizer can be provided on at least one side thereof.

Preferably, the liquid crystal switching element is further developed in such a way that its light transmission has its maximum or minimum amount in the alignment in the initial state of the liquid crystal layer and can be varied up to its other extreme value in reoriented states of the liquid crystal layer.

It is especially preferred to use the liquid crystal switching element according to the invention for varying the brightness and/or color of an image spot of an electrooptical display means, the latter being preferably a display screen. The liquid crystal switching elements of the electrooptical display means can be controlled particularly by a transistor matrix or by a direct driver means according to the time multiplex method.

The above as well as further advantages and features of the invention are to be explained in more detail below by means of preferred embodiments of electrooptical liquid crystal switching elements according to the invention with reference to FIGS. 1 to 7. Insofar as they relate to the design of preferred embodiments of electrooptical liquid crystal switching elements according to the invention, these figures are not true to scale intentionally for reasons of illustration.

Figure 1:
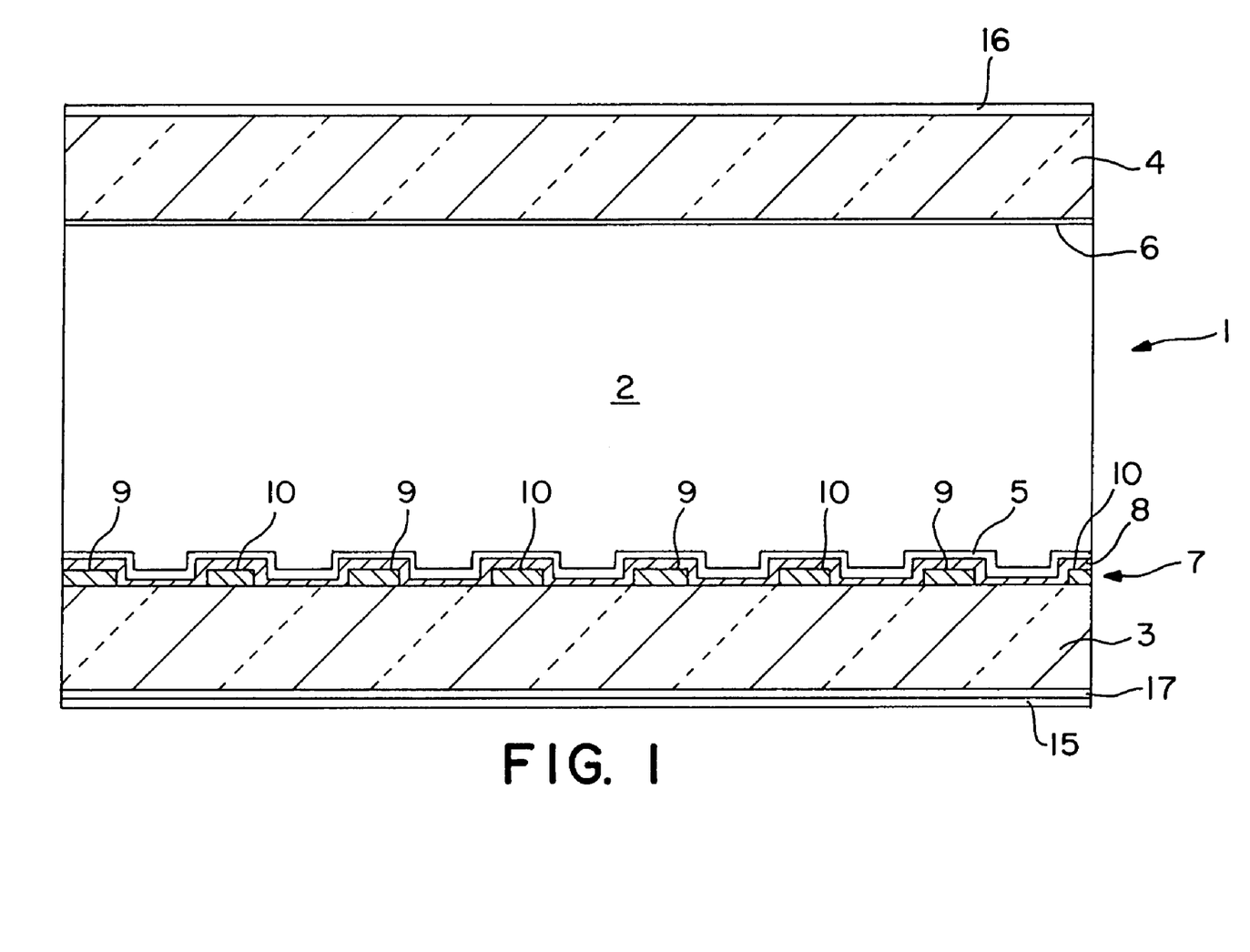
FIG. 1 shows a partial section through an embodiment of an electrooptical liquid crystal switching element according to the invention, which preferably forms an image spot of an electrooptical display means in that it controls the brightness and/or color of this image spot, so that the display screen of an electrooptical display means comprises a plurality of such liquid crystal switching elements integrated in a two-dimensional matrix arrangement.
Figure 2:
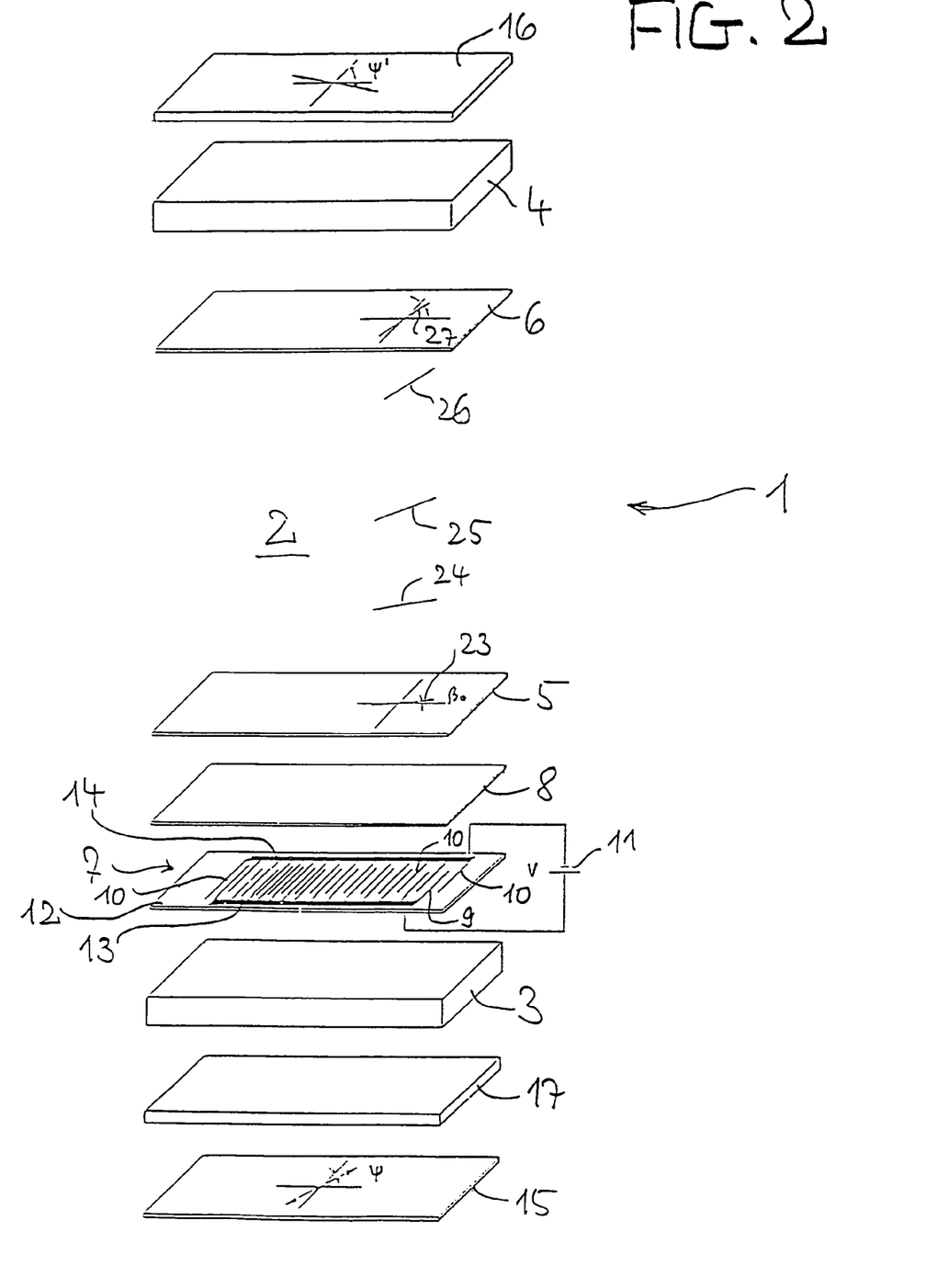
FIG. 2 shows a perspective view of an embodiment of an electrooptical liquid crystal switching element according to the invention for direct-light mode, the individual portions being shown in the exploded view, apart from the liquid crystal layer only outlined by orientation arrows.
Figure 2A:
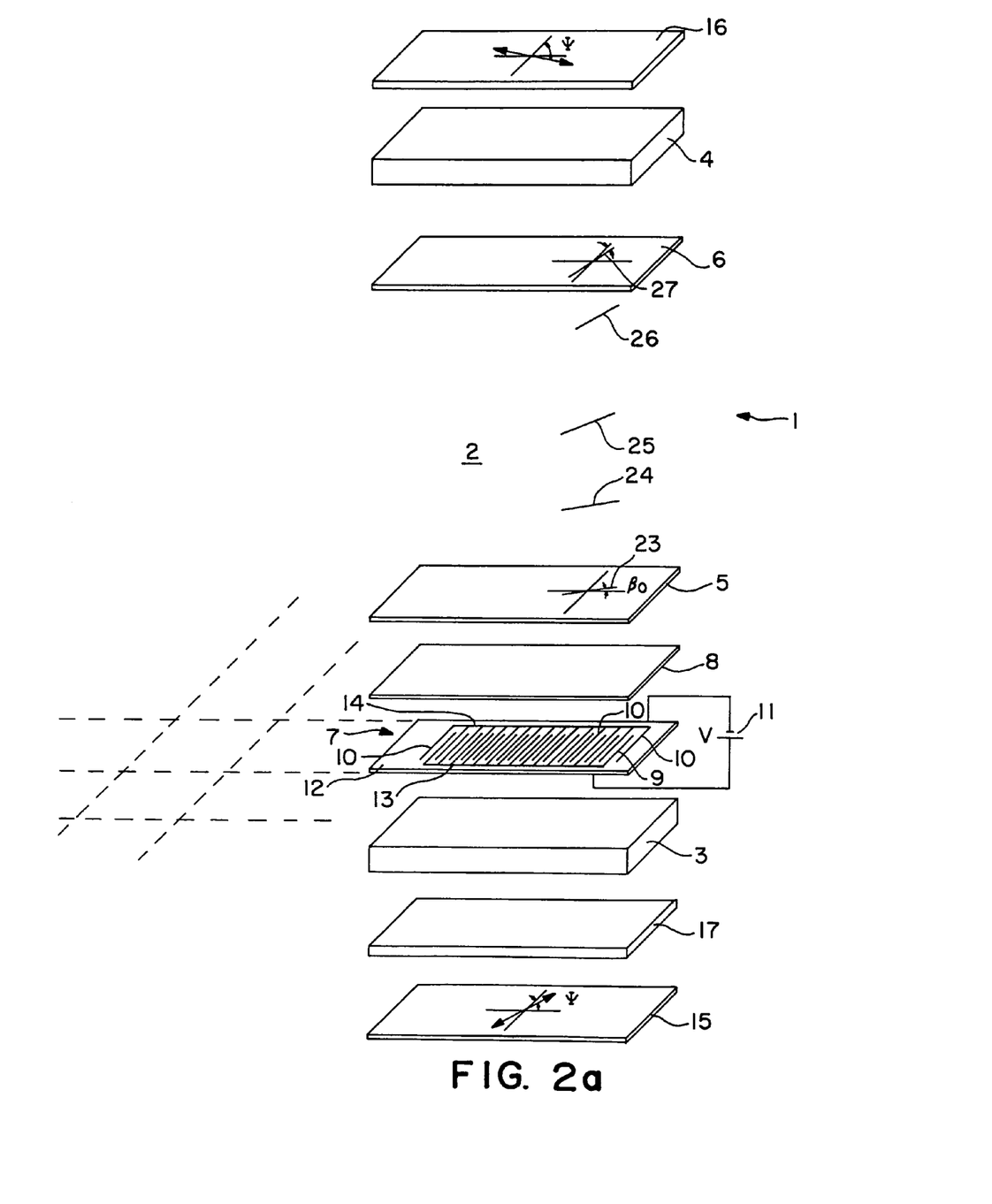
FIG. 2a illustrates a matrix embodiment of the display device of this invention.

The following detailed description of preferred embodiments of the invention refers initially to FIGS. 1 and 2. FIG. 1 shows a cross-section through an embodiment of an electrooptical liquid crystal switching element for direct-light mode in the assembled condition, while FIG. 2 illustrates an exploded view of the individual parts of the same liquid crystal switching element which is reduced in scale with respect to FIG. 1. Furthermore, the lower orientation layer and the lower insulating layer shown in FIG. 2 are outlined as plane layers in contrast to FIG. 1 for reasons of representation.

The electrooptical liquid crystal switching element 1 for direct-light mode as shown in FIGS. 1 and 2 comprises a liquid crystal layer 2 included between two substrates 3 and 4 referred to below as lower and upper substrates corresponding to the drawing, even though they may adopt any position in practice. These substrates 3 and 4 are preferably glass substrates, however, they may also consist of other suitable transparent, preferably insulating, materials such as plastics. In addition, substrates 3 and 4 are preferably developed planely and in parallel with each other, so that the liquid crystal layer 2 is preferably a substantially plane or planar layer.

In order to hold the liquid crystal layer 2 with a predetermined alignment in the initial state within the liquid crystal switching element 1, it does not border directly on the two substrates 3 and 4 but rather on respective orientation layers 5 and 6 which are referred to below as lower and upper orientation layers for the drawing. The upper orientation layer 6 is directly applied to the upper substrate 4, whereas a field-generating structure 7 and optionally an insulating layer 8 are provided between the lower substrate 3 and the lower orientation layer 5, so that the field-generating structure 7, the insulating layer 8 and the lower orientation layer 5 are applied onto the lower substrate 3 in the above-indicated order.

The field-generating structure 7 comprises strip or line-type electrodes 9 and 10 extend in parallel with one another and in parallel with the liquid crystal layer 2. The strip or line-type electrodes 9 alternate with the strip or line-type electrodes 10 as shown in FIGS. 1 and 2. The strip or line-type electrodes 9 are connected to a differing electric potential with respect to the strip or line-type electrodes 10, so that one electric field each is generated between the strip or line-type electrodes 9 and 10, which has a field component oriented predominantly in parallel with the liquid crystal layer 2. For example, the strip or line-type electrodes 9 are connected to one electric pole of a voltage source 11, whereas the strip or line-type electrodes 10 are connected to the other electric pole of this voltage source 11, as shown in FIG. 2. Although the voltage source 11 is illustrated as a direct-current source on grounds of principle and in principle could also be such a direct-current source, an ac voltage source 11 is used in practice to avoid degradation of the liquid crystal layer and the difficulties which it implies.

Figure 3:
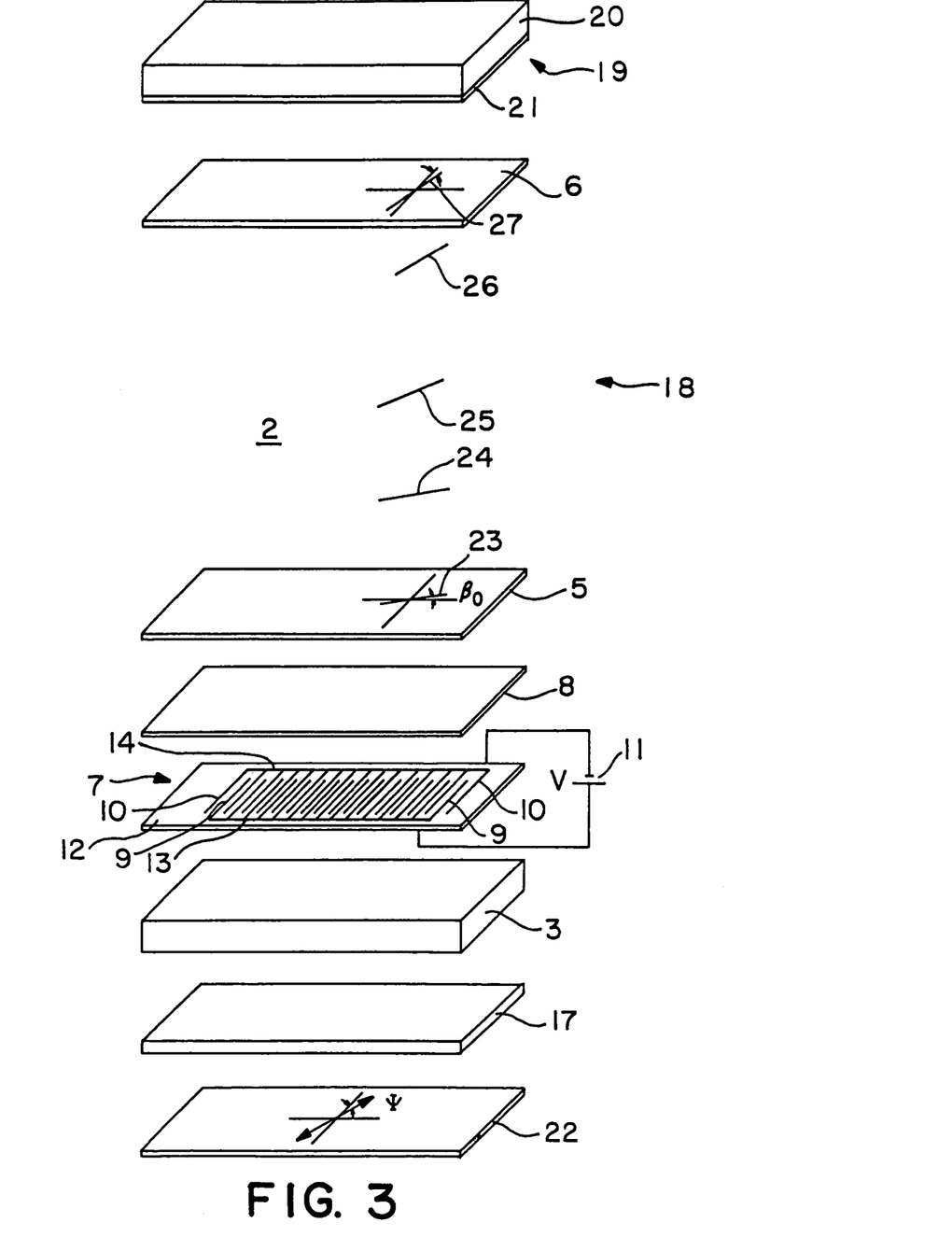
FIG. 3 shows a perspective view of an embodiment of an electrooptical liquid crystal switching element according to the invention for reflection mode, the individual portions being also illustrated in the exploded view, apart from the liquid crystal layer only outlined by orientation arrows.

The strip or line-type electrodes 9 and 10 are developed in comb-like engagement in the same plane in the presently shown embodiment of the liquid crystal switching element 1, namely on the surface of an insulating base layer 12, which may also be formed by the surface of substrate 3, in that the strip or line-type electrodes 9 are electrically connected with each other to give a first comb structure by a strip or line-type transverse electrode extending transversely, in particular perpendicularly, thereto and in that the strip or line-type electrodes 10 are electrically connected to each other to give a second comb structure by another strip or line-type transverse electrode extending transversely, in particular perpendicularly, thereto and in that furthermore the two comb structures are arranged in meshing engagement, as is illustrated especially well in FIGS. 2 and 3.

Figure 2B:
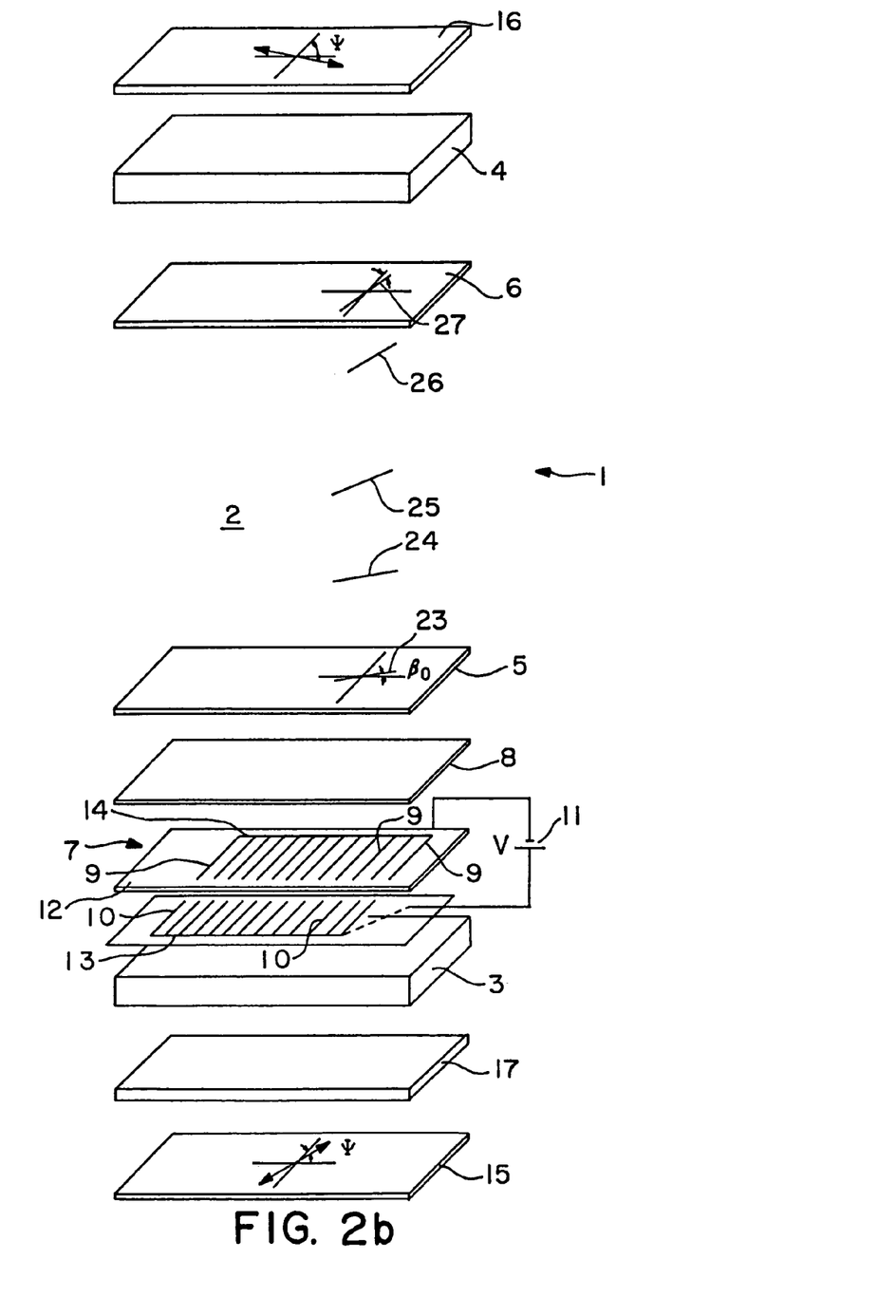
FIG. 2b shows a variant of FIG. 2 where the electrodes are arranged alternately in two planes.

Another possibility shown in FIG. 2b, consists in that the strip or line-type electrodes 9 are arranged on the upper side of the insulating base layer 12, whereas the strip or line-type electrodes 10 are arranged on the lower side of the insulating base layer 12, or vice versa. In this case, the strip or line-type electrodes can be developed as simple parallel strips or lines, without comb-like structures becoming necessary.

Furthermore, the liquid crystal switching element 1 shown in FIGS. 1 and 2 also comprises a polarizer 15 on the outer side of the substrate 3 and an analyzer 16 on the outer side of substrate 4. Depending on the passage of light direction, polarizer and analyzer may also be exchanged. Finally, an optical compensator 17 is provided between the polarizer 15 and the substrate 3. This optical compensator 17 may also be arranged between the analyzer 16 and the substrate 4 instead.

FIG. 3 shows a perspective view of an embodiment of an electrooptical liquid crystal switching element 18 for reflection mode in an exploded view of the individual parts of this liquid crystal switching element 18. It differs with respect to its outer design from the liquid crystal switching element 1 according to FIGS. 1 and 2 only in that a reflector 19 is provided instead of the analyzer 16 shown in FIGS. 1 and 2, which in the present embodiment consists of a substrate 20, e.g. a glass substrate, and a reflection layer 21 provided on the side of the substrate 20 facing the liquid crystal layer 2. Corresponding to this design the still remaining polarizer is simultaneously the analyzer and is therefore referred to as polarizer/analyzer 22 to differentiate it from that of FIGS. 1 and 2.

Figure 4:
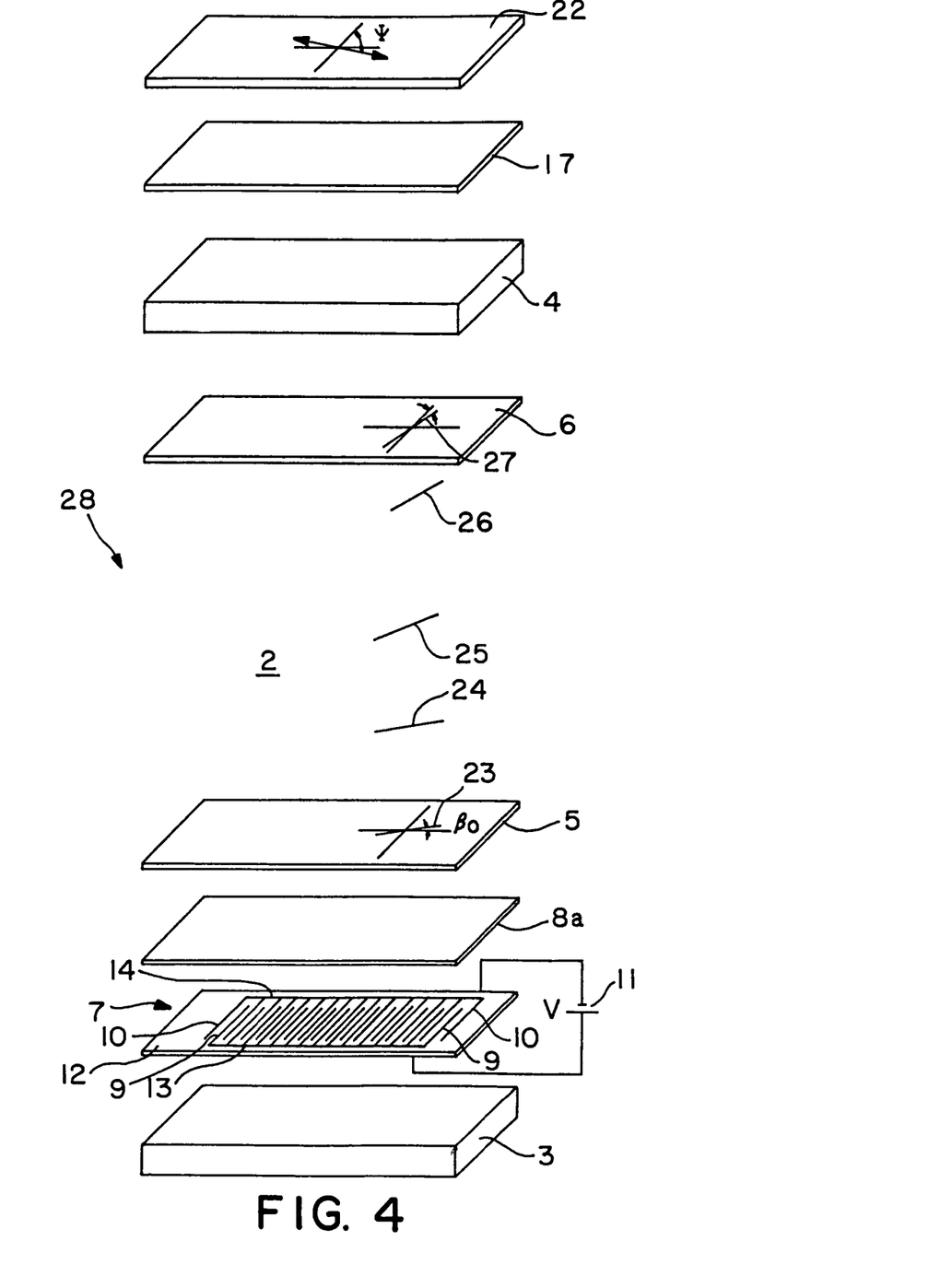
FIG. 4 shows a perspective view of another embodiment according to the invention.

Another embodiment of an electrooptical switching element 28 for reflection mode, which is shown in FIG. 4, differs from the electrooptical switching element 1 according to FIGS. 1 and 2 e.g. in that a dielectric mirror 8a is provided in FIGS. 1 and 2 instead of the insulating layer 8 and the birefringent compensator 17 is optionally provided between substrate 4 and analyzer 16. An analyzer/polarizer 22 is provided as the analyzer 16, which then acts as a polarizer and analyzer, so that the polarizer 15 of FIGS. 1 and 2 is dispensed with. This embodiment has the special advantage that neither the electrode structure 7 nor the substrate 3 have to be transparent when the dielectric mirror 8a is provided between the liquid crystal 2, on the one hand, and the arrangement of electrode structure 7 and substrate 3, on the other hand, as shown in FIG. 4. In this case, the orientation layer 5 is located between the liquid crystal 2 and the dielectric mirror 8a. The orientation layer 5 can also be a component of the dielectric mirror 8a. The electrode structure 7 can also be provided on the dielectric mirror 8a, particularly on its side facing the liquid crystal 2.

Furthermore, since the outer design of the liquid crystal switching element 18 and 28 is as for the rest equal to that of the liquid crystal switching element 1, the same reference numbers are used as in FIGS. 1 and 2, so that reference is made to the corresponding explanations of FIGS. 1 and 2 to avoid repetitions.

Dealt with below in more detail is the inner design of the liquid crystal switching elements 1, 18 and 28, i.e. with the respective parameters of the liquid crystal layer, the orientation layers, the polarizers, the field-generating structure, etc., all of which are important for the operation of the liquid crystal switching element 1, 18 and 28. They are shown in the below Table 1 and contained in FIGS. 2 and 3 insofar as possible:

TABLE 1

The following parameters are used to describe preferred embodiments of the liquid crystal switching elements with respect to their physical development:

| | |
|---|---|
| $\beta =$ | angle of twist of the liquid crystal 2 in its alignment in the initial state, i.e. angle between the director at substrate 3 or in the orientation layer 5 and the director at substrate 4 or in the orientation layer 6. |
| $\beta_o =$ | angle of orientation of the electric field component oriented predominantly in parallel with the liquid crystal layer 2, which is generated by the field-generating structure 7 to the preferred direction of the molecular axes of the liquid crystal 2, which have them in the alignment in the initial state of the liquid crystal 2 on the layer side of the liquid crystal layer 2, which faces the field-generating structure 7, i.e. at the orientation layer 5; this angle equals the angle between the director at substrate 3 or in the orientation layer 5 and the normal to the longitudinal direction of the strip or line-type electrodes 9, 10 in the plane of these strip or line-type electrodes. |
| $\alpha_o =$ | pretilt angle which is included by the alignment in the initial state of the liquid crystal layer 2 at least on its layer side of the liquid crystal layer 2 facing the field generating structure 7 and a plane in parallel with the, liquid crystal layer 2, the alignment in the initial state of the liquid crystal layer being here understood to mean the preferred direction of the molecular axes of the liquid crystal 2 in the alignment in the initial state of the liquid crystal layer. |
| $\psi =$ | angle between the director at substrate 3 or in the orientation layer 5 and the transmitting direction of the polarizer 15 and the polarizer/analyzer 22 respectively. |
| $\psi' =$ | angle between the director at substrate 3 or in the orientation layer 5 and the transmitting direction of analyzer 16. |
| $\|\psi - \psi'\| =$ | angle between the transmitting direction of polarizer and analyzer. |
| $d =$ | thickness of the liquid crystal structure 2 |
| $\epsilon_{II}, \epsilon_{I} =$ | dielectric constant in parallel with and perpendicular to, respectively, the director of the liquid crystal |
| $\Delta\epsilon =$ | dielectric anisotropy of the liquid crystal = difference between $\epsilon_{II}$ and $\epsilon_{I}$ i.e. $\Delta\epsilon = \epsilon_{II} - \epsilon_{I}$ |
| $n_o, n_e =$ | ordinary and extraordinary respectively, refractive index of the liquid crystal |
| $\lambda =$ | wavelength of light |
| $\Delta n =$ | $n_e - n_o$. |

Figure 5:
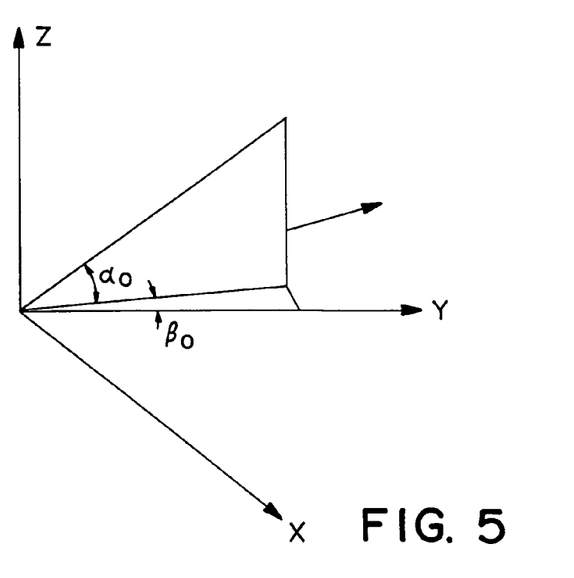
FIG. 5 shows a diagram of the pretilt angle $\alpha_0$ which is preferably included by the alignment in the initial state of the liquid crystal layer and a plane in parallel with the liquid crystal layer, as well as the orientation angle $\beta_0$ which is formed by the field component, oriented predominantly in parallel with the liquid crystal layer, of the electric field reorienting the liquid crystal together with the alignment in the initial state which the liquid crystal layer has on its layer side facing the field-generating structure.

Arrows 23 to 27 of FIGS. 2 and 3 indicate preferred directions of the liquid crystal 2, the preferred direction at the orientation layer 5 being particularly outlined by arrow 23 and the preferred direction at the orientation layer 6 being especially shown by arrow 27, while arrows 24, 25 and 26 show preferred directions in the intermediate area, which are introduced to better illustrate the liquid crystal twist. The pretilt angle $\alpha_0$ and the angle of orientation $\beta_0$ are shown in FIG. 5, the x and y axes defining a plane extending in parallel with the liquid crystal layer 2, whereas the z axis extends perpendicularly to the liquid crystal layer 2, i.e. corresponds to the direction of thickness of the liquid crystal layer. The x and y axes correspond to the directions of width and length of the liquid crystal 2.

Below Tables 2 and 3 give preferred initial conditions for the direct-light mode and the reflection mode, the initial condition being understood to mean the state present when no electric field is applied via the field-generating structure 7.

TABLE 2

Preferred initial states in homogeneous planar orientation in direct-light mode

| initial state | $\beta$ | $\Delta\epsilon$ | $d \times \Delta n/\lambda$ | $\alpha_0$ | $\beta_0$ | $\psi$ | $\|\psi - \psi'\|$ |
|---|---|---|---|---|---|---|---|
| D1 | $0° \pm 15°$ | $>0$ | $>0, <4$ | $\geqq 0°, <30°$ | $>70°, <90°$ | $0°, 90°$ | $90°, 0°$ preferably $90°$ |
| D2 | $0° \pm 15°$ | $<0$ | $>0, <4$ | $\geqq 0°, <30°$ | $>0°, <20°$ | $0°, 90°$ | $90°, 0°$, preferbaly $90°$ |
| D3 | $90° \pm 15°$ | $>0$ | $>0, <4$ preferably $\frac{1}{2}\sqrt{3}, \frac{1}{2}\sqrt{15}, \frac{1}{2}\sqrt{35}$ | $\geqq 0°, <30°$ | $>70°, <90°$ | $0°, 90°$ | $0°, 90°$ preferably $0°$ |
| D4 | $90° \pm 15°$ | $<0$ | $>0, <4$ preferably $\frac{1}{2}\sqrt{3}, \frac{1}{2}\sqrt{15}, \frac{1}{2}\sqrt{35}$ | $\geqq 0°, <30°$ | $>0°, <20°$ | $0°, 90°$ | $0°, 90°$ preferably $0°$ |

TABLE 3

Preferred initial states in homogeneous planar orientation in reflection mode

| initial state | $\beta$ | $\Delta\epsilon$ | $d \times \Delta n/\lambda$ | $\alpha_0$ | $\beta_0$ | $\psi$ | $\|\psi - \psi'\|$ |
|---|---|---|---|---|---|---|---|
| R1 | $0° \pm 15°$ | $>0$ | $>0, <2$ preferably $0.86$ | $\geqq 0°, <30°$ | $>70°, 90°$ | $0°, 90°$ | $90°, 0°$ preferably $90°$ |
| R2 | $0° \pm 15°$ | $<0$ | $>0, <2$ preferably $0.36$ | $\geqq 0°, <30°$ | $>0°, <20°$ | $0°, 90°$ | $90°, 0°$ preferbaly $90°$ |
| R3 | $60° \pm 5°$ | $>0$ | $>0, <2$ preferably $0.36$ | $\geqq 0°, <30°$ | $>70°, <90°$ | $0°, 90°$ | $0°, 90°$ |
| R4 | $60° \pm 5°$ | $<0$ | $>0, <2$ preferably $0.36$ | $\geqq 0°, <30°$ | $>0°, \leqq 20°$ | $0°, 90°$ | $0°, 90°$ |

Reference is now made to the fact that the statement made on the values of d×Δn/λ as well as $\alpha_0$ and $\beta_0$ are ranges, i.e. that the two values provided with the sign ≧ or ≦ or > or < each indicate the two ranges, depending on the sign inclusive or exclusive of this limit.

When the electrooptical liquid crystal switching element 1 or 18 or 28 is used to vary the brightness and/or color of an image spot of an electrooptical display means, the respective liquid crystal switching element 1 or 18 according to FIGS. 1, 2 or 3 forms a single image spot, so that a large plurality of such liquid crystal switching elements 1, 18 or 28 are incorporated into a display screen. The substrates, the orientation layers, the polarizers, the analyzers and the polarizers/analyzers, respectively, the reflectors and the optical compensators, all of which are shown in FIGS. 1 to 3 as individual parts for reasons or representation, each form a component joint, preferably integral, for all image spots, whereas each individual image spot has a field-generating structure 7 of its own. If it is no comb structure of the kind shown in FIGS. 1 to 3, this field-generating structure may also be composed of strip or line-type electrodes extending as a whole through the entire area of the electrooptical display means if it is controlled intersection-wise in corresponding manner, e.g. according to the time multiplex method.

Preferred quantities for the liquid crystal elements are given below, which will apply in particular if the liquid crystal switching elements are used as image spots in an electrooptical display means:

| | |
|---|---|
| Thickness of the liquid crystal layer: | 1 μm to 10 μm |
| area size of the field-generating structure corresponding to one image spot: | square having a side length of 10 μm to 1 mm |
| distance between adjacent strip or line-type electrodes: | 2 μm to 50 μm |
| voltage between adjacent strip or line-type electrodes in the case of maximum contrast: | 1 volt to 80 volts |

Reference is made to the fact that the application of a polarization sheet, i.e. the polarizer/analyzer 22 in front of the reflective liquid crystal switching element 18 or 28, corresponds to parallel polarizers 15, 16 (i.e. an analyzer 16 in parallel with the polarizer 15 in the transmitting direction). The use of a reflective liquid crystal switching element 18 or 28 in combination with a polarizing beam splitter (McNeille prism) corresponds to cross polarizers 15, 16 in the transmissive liquid crystal switching element 1. This arrangement is especially suitable for great light-transmitting projectors.

The function, particularly the optical behavior, of the above-described liquid crystal switching elements 1 and 18 as well as 28 was investigated by means of computer simulation and confirmed by experiments conducted with respect to correspondingly developed liquid crystal switching elements.

Figure 6:
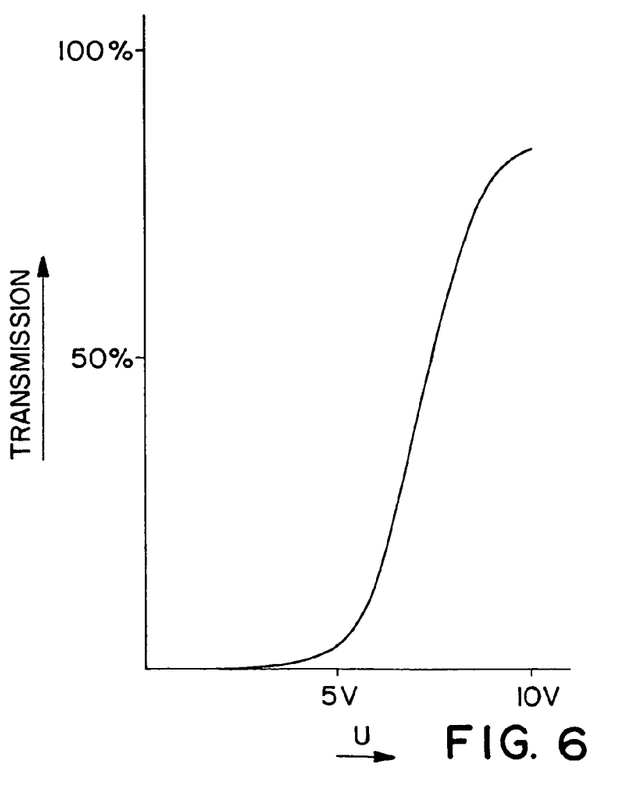
FIG. 6 shows a curve determined by means of experiments, which shows the transmission of the perpendicularly incident light as a function of the applied voltage in the case of a typical embodiment of an electrooptical liquid crystal switching element according to the invention.
Figure 7:
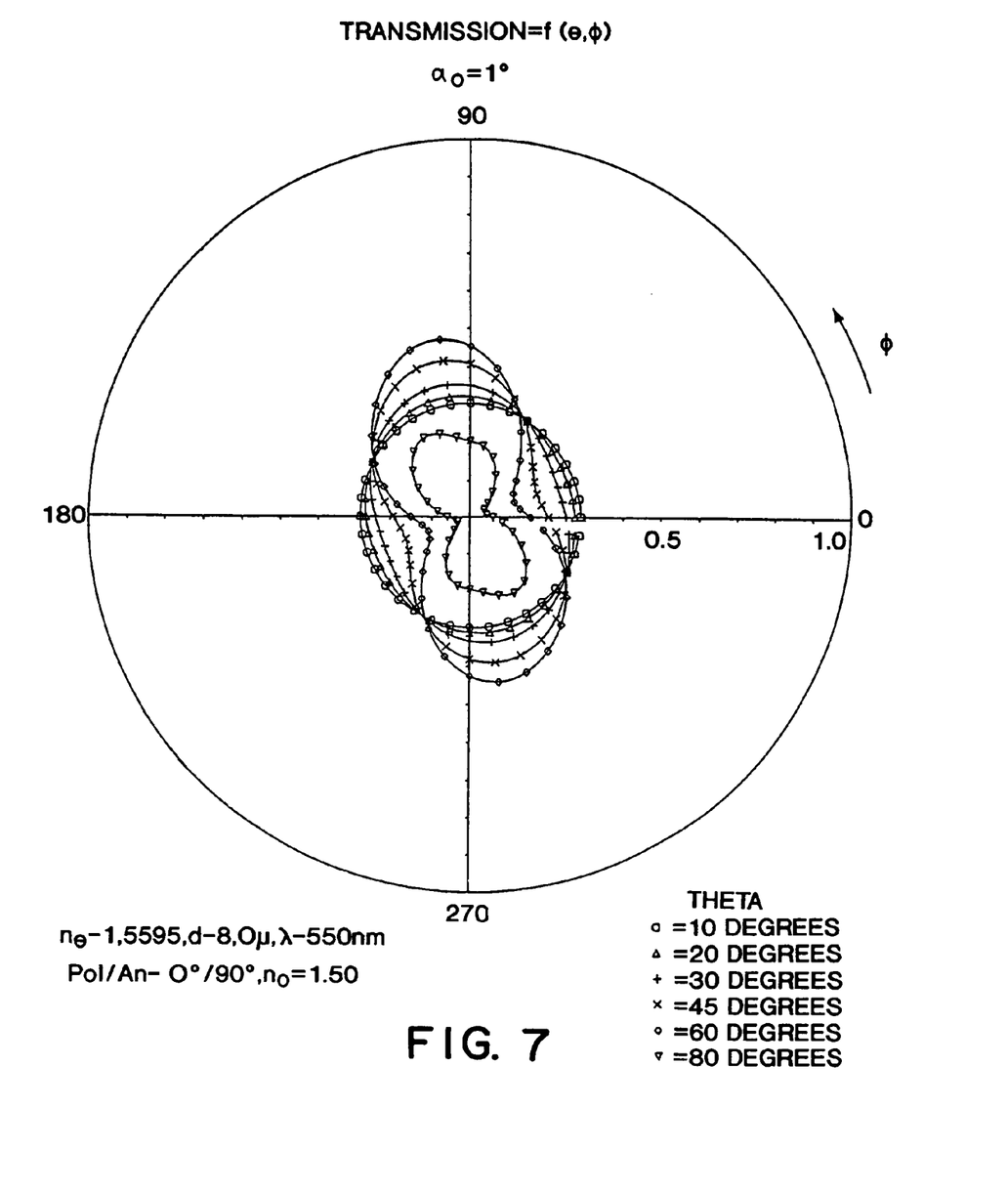
FIG. 7 shows the values for the transmission determined by means of calculation in the case of a typical embodiment of an electrooptical liquid crystal switching element according to the invention, which show that the dependence of the transmission, and thus the contrast, on the angle is largely eliminated in the case of an electrooptical liquid crystal switching element.
Figure 8:
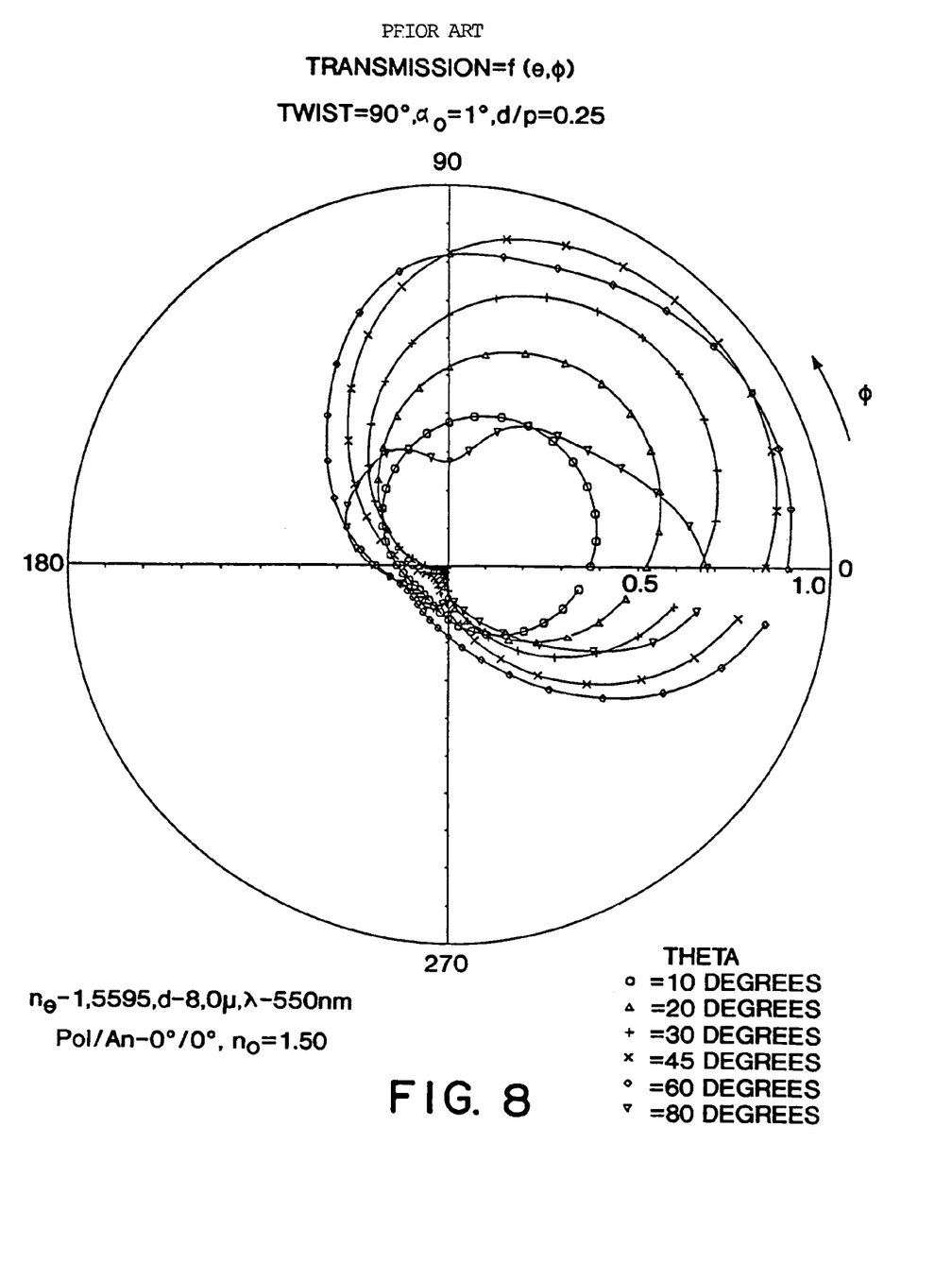
FIG. 8 shows transmission values determined by means of calculation for a known electrooptical liquid crystal TN switching element, which illustrate the dependence of the transmission on the angle using polar coordinates, the scale of the representation being the same as that of FIG. 6, so that a comparison between FIGS. 7 and 8 clearly shows the high dependence of transmission on the angle for the known electrooptical liquid crystal switching elements and as compared thereto virtually no dependence of the transmission on the angle within a large area for the electrooptical liquid crystal switching element according to the invention.

The results of these investigations are shown in FIGS. 6 and 7. FIG. 8 illustrates the result of a comparative investigation made with a TN liquid crystal switching element, i.e. a known liquid crystal switching element having a helical and nematic liquid crystal.

The liquid crystal switching element on which the investigation result on FIG. 6 is based on which was designed according to FIGS. 1 and 2 had the following design quantities:

| | |
|---|---|
| Thickness of the liquid crystal layer = | 6.9 μm |
| dielectric anisotropy = | -1.5 |
| optical path length d × Δ n/π = | 0.865 |
| initial angle of twist β = | 0 |
| angle of orientation $\beta_o$ = | 5* |
| pretilt angle $\alpha_o$ = | 5* |
| angle between polarizer and analyzer = | 90 |

The following explanatory statements have to be made on FIGS. 7 and 8, a comparison between which clearly shows the surprising properties of the electrooptical liquid crystal switching element according to the invention over the formerly known liquid crystal switching elements:

The angle of THETA is the angle between the observation direction and the normal to the liquid crystal layer. The intensity of the transmission light is indicated on the axes of the polar coordinate presentation. The transmission is about 25% for perpendicular pretilt.

Reference is made to the fact that in the electrooptical switching element 1 according to FIGS. 1 and 2 the orientation layer 6 and the substrate 4 may optionally be dispensed with when liquid crystalline polymers are used, for example. The embodiments of the electrooptical switching elements for reflection mode can be modified correspondingly. Therefore, the term "liquid crystal" also comprises liquid crystalline polymers or other liquid crystalline substances in the present description and claims.

The liquid crystals used for the invention are preferably, however, by no means exclusively, nematic liquid crystals or nematic liquid crystalline polymers.

The invention claimed is:

1. An electro-optical display device comprising a plurality of liquid crystal switching elements which comprise a liquid crystal layer comprising liquid crystal molecules and having a surface for display of an image which is switched under control of an electric field having a predominant component parallel to said surface, wherein said liquid crystal molecules have a pretilt angle $\alpha_0$, $0°\leq\alpha_0<30°$, and an orientation angle $\beta_0$, $0°<\beta_0<90°$, wherein the liquid crystal layer has an untwisted structure in its initial orientation and can be reoriented to a twisted structure by said field component oriented predominantly parallel to the liquid crystal layer.

2. An electro-optical display device of claim 1, wherein $\beta_0$ is not 45°.

3. An electro-optical device of claim 1, wherein said liquid crystal molecules have an orientation angle $\beta_0$ which is not 40°, not 45° and not 50°.

4. An electro-optical device of claim 1, wherein said liquid crystal molecules have an orientation angle $\beta_0>55°$ or $\beta_0<35°$.

5. An electro-optical device of claim 1, wherein said liquid crystal molecules have an orientation angle $\beta_0>65°$ or $\beta_0<25°$.

6. An electro-optical device of claim 1, wherein said liquid crystal molecules have an orientation angle $\beta_0>70°$ or $\beta_0<20°$.

7. An electro-optical device of claim 1, wherein said liquid crystal molecules have an orientation angle $\beta_0>75°$ or $\beta_0<15°$.

8. An electro-optical display device comprising a plurality of liquid crystal switching elements which comprise a liquid crystal layer comprising liquid crystal molecules and having a surface for display of an image which is switched under control of an electric field having a predominant component parallel to said surface, wherein said liquid crystal molecules have a pretilt angle $\alpha_0$, $0° \leq \alpha_0 < 30°$, wherein said liquid crystal switching elements further comprise:
(a) said liquid crystal molecules which are twistable;
(b) a substrate;
(c) an electrode structure which generates said electric field having a component predominantly parallel to the surface of said liquid crystal layer;
(d) a polarizer in optical relation with said liquid crystal layer;
(e) a voltage source or a current source connected to said electrode structure; and
(f) an orientation layer, in contact with at least one surface of said liquid crystal layer, which aligns the liquid crystal molecules in a direction whereby they have an orientation angle $\beta_0$, $0° < \beta_0 < 90°$, wherein the liquid crystal layer has an untwisted structure in its initial orientation and can be reoriented to a twisted structure by said field component oriented predominantly parallel to the liquid crystal layer.

9. The electro-optical display device of claim 1, 2, 3, 4, 5, 6, 7 or 8, wherein said liquid crystal molecules have a pretilt angle $\alpha_0$, $0° \leq \alpha_0 \leq 1°$.

10. The electro-optical display device of claim 1, 2, 3, 4, 5, 6, 7 or 8, wherein said liquid crystal molecules have a pretilt angle $\alpha_0$, $0° < \alpha_0 \leq 5°$.

11. The electro-optical display device of claim 1, 2, 3, 4, 5, 6, 7 or 8, wherein said liquid crystal molecules have a pretilt angle $\alpha_0$, $0° < \alpha_0 \leq 2°$.

12. The electro-optical display device of claim 1, 2, 3, 4, 5, 6, 7 or 8, wherein said liquid crystal molecules have a pretilt angle $\alpha_0$, $0° < \alpha_0 \leq 1°$.

13. The electro-optical display device of claim 1, 2, 3, 4, 5, 6, 7 or 8, wherein the initial twist angle $\beta$ of the liquid crystal molecules is within 15 degrees of 0°.

14. The electro-optical display device of claim 1, 2, 3, 4, 5, 6, 7 or 8, wherein the initial twist angle $\beta$ of the liquid crystal molecules is within 15 degrees of 90°.

15. The electro-optical display device of claim 1, 2, 3, 4, 5, 6, 7 or 8, further comprising an analyzer in optical relation with said polarizer.

16. The electro-optical display device of claim 1, 2, 3, 4, 5, 6, 7 or 8, wherein $\Delta n \cdot d\lambda$ of the liquid crystal layer is larger than zero but smaller than four.

17. The electro-optical display device of claim 1, 2, 3, 4, 5, 6, 7 or 8, wherein the axes of switching-effective twisting of the liquid crystal molecules are substantially perpendicular to the plane of the substrate.

18. The electro-optical display device of claim 1, 2, 3, 4, 5, 6, 7 or 8, wherein said matrix is an active matrix.

19. The electro-optical display device of claim 1, 2, 3, 4, 5, 6, 7 or 8, wherein the plurality of liquid crystal switching elements are addressed by the time multiplex method.

20. The electro-optical display device of claim 1, 2, 3, 4, 5, 6, 7 or 8, wherein the active matrix is a transistor matrix.

21. The electro-optical display device of claim 1, 2, 3, 4, 5, 6, 7 or 8, wherein the angle between the direction of the initial orientation of the liquid crystal molecules at the surface of the liquid crystal layer on the side of the polarizer and the light transmitting direction of the polarizer is approximately 90°, and the angle between the light transmitting direction of said polarizer and the light transmitting direction of the analyzer is approximately 0°.

22. The electro-optical display device of claim 1, 2, 3, 4, 5, 6, 7 or 8, wherein the angle between the direction of the initial orientation of the liquid crystal molecules at the surface of the liquid crystal layer on the side of the polarizer and the light transmitting direction of the polarizer is approximately 90°, and the angle between the light transmitting direction of said polarizer and the light transmitting direction of the analyzer is approximately 90°.

23. The electro-optical display device of claim 1, 2, 3, 4, 5, 6, 7 or 8, wherein the switching elements comprise a birefringent optical compensator in optical correlation with the liquid-crystal layer.

24. The electro-optical display device of claim 1, 2, 3, 4, 5, 6, 7 or 8, wherein said liquid crystal layer comprises a polymer.

25. An electro-optical display device comprising a plurality of liquid crystal switching elements which comprise a liquid crystal layer comprising liquid crystal molecules and having a surface for display of an image which is switched under control of an electric field having a predominant component parallel to said surface, wherein said liquid crystal molecules have a pretilt angle $\alpha_0$, $0° \leq \alpha_0 < 30°$, and an orientation angle $\beta_0$, $0° < \beta_0 < 90°$, wherein the initial twist angle $\beta$ of the liquid crystal molecules is within 15 degrees of 0°, or with 15 degrees of 90°, wherein said liquid crystal molecules have an orientation angle $\beta_0 > 70°$ or $\beta_0 < 20°$.

26. An electro-optical device of claim 25, wherein said liquid crystal molecules have an orientation angle $\beta_0 > 75°$ or $\beta_0 < 15°$.

27. An electro-optical display device comprising a plurality of liquid crystal switching elements which comprise a liquid crystal layer comprising liquid crystal molecules and having a surface for display of an image which is switched under control of an electric field having a predominant component parallel to said surface, wherein said liquid crystal molecules have a pretilt angle $\alpha_0$, $0° \leq \alpha_0 < 30°$, and an orientation angle $\beta_0$, $0° < \beta_0 < 90°$, wherein said liquid crystal molecules have an orientation angle $\beta_0 > 70°$ or $\beta_0 < 20°$.

28. An electro-optical device of claim 27, wherein said liquid crystal molecules have an orientation angle $\beta_0 > 75°$ or $\beta_0 < 15°$.

29. An electro-optical display device comprising a plurality of liquid crystal switching elements which comprise a liquid crystal layer comprising liquid crystal molecules and having a surface for display of an image which is switched under control of an electric field having a predominant component parallel to said surface, wherein said liquid crystal molecules have a pretilt angle $\alpha_0$, $0° \leq \alpha_0 < 30°$, wherein said liquid crystal switching elements further comprise:
(a) said liquid crystal molecules which are twistable;
(b) a substrate;
(c) an electrode structure which generates said electric field having a component predominantly parallel to the surface of said liquid crystal layer;
(d) a polarizer in optical relation with said liquid crystal layer;
(e) a voltage source or a current source connected to said electrode structure; and
(f) an orientation layer, in contact with at least one surface of said liquid crystal layer, which aligns the liquid crystal molecules in a direction whereby they have an orientation angle $\beta_0$, $0° < \beta_0 < 90°$, wherein said liquid crystal molecules have an orientation angle $\beta_0 > 70°$ or $\beta_0 < 20°$.

30. An electro-optical device of claim 29, wherein said liquid crystal molecules have an orientation angle $\beta_0 > 75°$ or $\beta_0 < 15°$.

31. The electro-optical display device of claim 27, 29, 28 or 30, wherein said liquid crystal molecules have a pretilt angle $\alpha_0$, $0° \leq \alpha_0 \leq 1°$.

32. The electro-optical display device of claim 27, 29, 28 or 30, wherein said liquid crystal molecules have a pretilt angle $\alpha_0$, $0° < \alpha_0 \leq 5°$.

33. The electro-optical display device of claim 27, 29, 28 or 30, wherein said liquid crystal molecules have a pretilt angle $\alpha_0$, $0° < \alpha_0 \leq 2°$.

34. The electro-optical display device of claim 27, 29, 28 or 30, wherein said liquid crystal molecules have a pretilt angle $\alpha_0$, $0° < \alpha_0 \leq 1°$.

35. The electro-optical display device of claim 27, 29, 28 or 30, wherein the initial twist angle $\beta$ of the liquid crystal molecules is within 15 degrees of 0°, or within 15 degrees of 90°.

36. The electro-optical display device of claim 27, 29, 28 or 30, further comprising an analyzer in optical relation with said polarizer.

37. The electro-optical display device of claim 27, 29, 28 or 30, wherein $\Delta n \cdot d / \lambda$ of the liquid crystal layer is larger than zero but smaller than four.

38. The electro-optical display device of claim 27, 29, 28 or 30, wherein the axes of switching-effective twisting of the liquid crystal molecules are substantially perpendicular to the plane of the substrate.

39. The electro-optical display device of claim 27, 29, 28 or 30, wherein said matrix is an active matrix.

40. The electro-optical display device of claim 27, 29, 28 or 30, wherein the plurality of liquid crystal switching elements are addressed by the time multiplex method.

41. The electro-optical display device of claim 27, 29, 28 or 30, wherein the active matrix is a transistor matrix.

42. The electro-optical display device of claim 27, 29, 28 or 30, wherein the angle between the direction of the initial orientation of the liquid crystal molecules at the surface of the liquid crystal layer on the side of the polarizer and the light transmitting direction of the polarizer is approximately 90°, and the angle between the light transmitting direction of said polarizer and the light transmitting direction of the analyzer is approximately 0°.

43. The electro-optical display device of claim 27, 29, 28 or 30, wherein the angle between the direction of the initial orientation of the liquid crystal molecules at the surface of the liquid crystal layer on the side of the polarizer and the light transmitting direction of the polarizer is approximately 90°, and the angle between the light transmitting direction of said polarizer and the light transmitting direction of the analyzer is approximately 90°.

44. The electro-optical display device of claim 27, 29, 28 or 30, wherein the switching elements comprise a birefringent optical compensator in optical correlation with the liquid-crystal layer.

45. The electro-optical display device of claim 27, 29, 28 or 30, wherein said liquid crystal layer comprises a polymer.

46. An electro-optical display device comprising a liquid crystal layer comprising liquid crystal molecules and having a surface for display of an image which is switched under control of an electric field having a predominant component parallel to said surface, wherein said liquid crystal molecules are in homogeneous alignment and have a pretilt angle $\alpha_0$ and an orientation angle $\beta_0$ which prevent domain formation in said image and/or which impart to said image a small viewing angle dependence and a correspondingly improved image contrast, wherein said $\alpha_0$ and $\beta_0$ values impart to said image a small viewing angle dependence wherein the variation of the degree of light transmission (1-fmin/fmax) is, over all $\phi$ values, below about 0.57 when $\ominus$ is up to 45°.

47. An electro-optical display device of claim 46 comprising a plurality of liquid crystal switching elements which comprise a liquid crystal layer comprising liquid crystal molecules and having a surface for display of an image which is switched under control of an electric field having a predominant component parallel to said surface, wherein said liquid crystal molecules have a pretilt angle $\alpha_0$, $0° \leq \alpha_0 < 30°$, and an orientation angle $\beta_0$, $0° < \beta_0 < 90°$.

48. An electro-optical display device comprising a liquid crystal layer comprising liquid crystal molecules and having a surface for display of an image which is switched under control of an electric field having a predominant component parallel to said surface, wherein said liquid crystal molecules are in homogeneous alignment and have a pretilt angle $\alpha_0$ and an orientation angle $\beta_0$ which reduce domain formation in said image and/or which impart to said image a small viewing angle dependence and a correspondingly improved image contrast, wherein said $\alpha_0$ and $\beta_0$ values impart to said image a small viewing angle dependence wherein the variation of the degree of light transmission (1-fmin/fmax) is, over all $\phi$ values, below about 0.57 when $\ominus$ is up to 45°.

49. An electro-optical display device of claim 48 comprising a plurality of liquid crystal switching elements which comprise a liquid crystal layer comprising liquid crystal molecules and having a surface for display of an image which is switched under control of an electric field having a predominant component parallel to said surface, wherein said liquid crystal molecules have a pretilt angle $\alpha_0$, $0° \leq \alpha_0 < 30°$ and an orientation angle $\beta_0$, $0° < \beta_0 < 90°$.

50. An electro-optical display device of claim 49, wherein $\beta_0$ is not 45°.

51. An electro-optical device of claim 49, wherein said liquid crystal molecules have an orientation angle $\beta_0$ which is not 40°, not 45° and not 50°.

52. An electro-optical device of claim 49, wherein said liquid crystal molecules have an orientation angle $\beta_0 > 55°$ or $\beta_0 < 35°$.

53. An electro-optical device of claim 49, wherein said liquid crystal molecules have an orientation angle $\beta_0 > 65°$ or $\beta_0 < 25°$.

54. An electro-optical device of claim 49, wherein said liquid crystal molecules have an orientation angle $\beta_0 > 70°$ or $\beta_0 < 20°$.

55. An electro-optical device of claim 49, wherein said liquid crystal molecules have an orientation angle $\beta_0 > 75°$ or $\beta_0 < 15°$.

56. An electro-optical display device of claim 48 comprising a plurality of liquid crystal switching elements which comprise a liquid crystal layer comprising liquid crystal molecules and having a surface for display of an image which is switched under control of an electric field having a predominant component parallel to said surface, wherein said liquid crystal molecules have a pretilt angle $\alpha_0$, $0° \leq \alpha_0 < 30°$, wherein said liquid crystal switching elements further comprise:
(a) said liquid crystal molecules which are twistable;
(b) a substrate;
(c) an electrode structure which generates said electric field having a component predominantly parallel to the surface of said liquid crystal layer;
(d) a polarizer in optical relation with said liquid crystal layer;
(e) a voltage source or a current source connected to said electrode structure; and (f) an orientation layer, in contact with at least one surface of said liquid crystal layer, which aligns the liquid crystal molecules in a direction whereby they have an orientation angle $\beta_0$, $0°<\beta_0<90°$.

57. The electro-optical display device of claim 49, 50, 51, 52, 53, 54, 55, or 56, wherein said liquid crystal molecules have a pretilt angle $\alpha_0$, $0°\leq\alpha_0\leq1°$.

58. The electro-optical display device of claim 49, 50, 51, 52, 53, 54, 55, or 56, wherein said liquid crystal molecules have a pretilt angle $\alpha_0$, $0°<\alpha_0\leq2°$.

59. The electro-optical display device of claim 49, 50, 51, 52, 53, 54, 55, or 56, wherein said liquid crystal molecules have a pretilt angle $\alpha_0$, $0°<\alpha_0\leq1°$.

60. The electro-optical display device of claim 49, 50, 51, 52, 53, 54, 55, or 56, further comprising an analyzer in optical relation with said polarizer.

61. The electro-optical display device of claim 49, 50, 51, 52, 53, 54, 55, or 56, wherein the axes of switching-effective twisting of the liquid crystal molecules are substantially perpendicular to the plane of the substrate.

62. The electro-optical display device of claim 49, 50, 51, 52, 53, 54, 55, or 56, wherein the plurality of liquid crystal switching elements are addressed by the time multiplex method.

63. The electro-optical display device of claim 49, 50, 51, 52, 53, 54, 55, or 56, wherein the active matrix is a transistor matrix.

64. The electro-optical display device of claim 49, 50, 51, 52, 53, 54, 55, or 56, wherein the angle between the direction of the initial orientation of the liquid crystal molecules at the surface of the liquid crystal layer on the side of the polarizer and the liquid transmitting direction of the polarizer is approximately 90°, and the angle between the light transmitting direction of said polarizer and the light transmitting direction of the analyzer is approximately 0°.

65. The electro-optical display device of claim 49, 50, 51, 52, 53, 54, 55, or 56, wherein the angle between the direction of the initial orientation of the liquid crystal molecules at the surface of the liquid crystal layer on the side of the polarizer and the light transmitting direction of the polarizer is approximately 90°, and the angle between the light transmitting direction of said polarizer and the light transmitting direction of the analyzer is approximately 90°.

66. The electro-optical display device of claim 49, 50, 51, 52, 53, 54, 55, 56 or 47, wherein said liquid crystal molecules have a pretilt angle $\alpha_0$, $0°<\alpha_0\leq5°$.

67. The electro-optical display device of claim 49, 50, 51, 52, 53, 54, 55, 56 or 47, wherein the initial twist angle $\beta$ of the liquid crystal molecules is within 15 degrees of 0°, or within 15 degrees of 90°.

68. The electro-optical display device of claim 49, 50, 51, 52, 53, 54, 55, 56, or 47, wherein $\Delta n \cdot d/\lambda$ of the liquid crystal layer is larger than zero but smaller than four.

69. The electro-optical display device of claim 49, 50, 51, 52, 53, 54, 55, 56 or 47, wherein said matrix is an active matrix.

70. The electro-optical display device of claim 49, 50, 51, 52, 53, 54, 55, 56 or 47, wherein the switching elements comprise a birefringent optical compensator in optical correlation with the liquid-crystal layer.

71. The electro-optical display device of claim 49, 50, 51, 52, 53, 54, 55, 56 or 47, wherein said liquid crystal layer comprises a polymer.

* * * * *